UNITED STATES PATENT OFFICE.

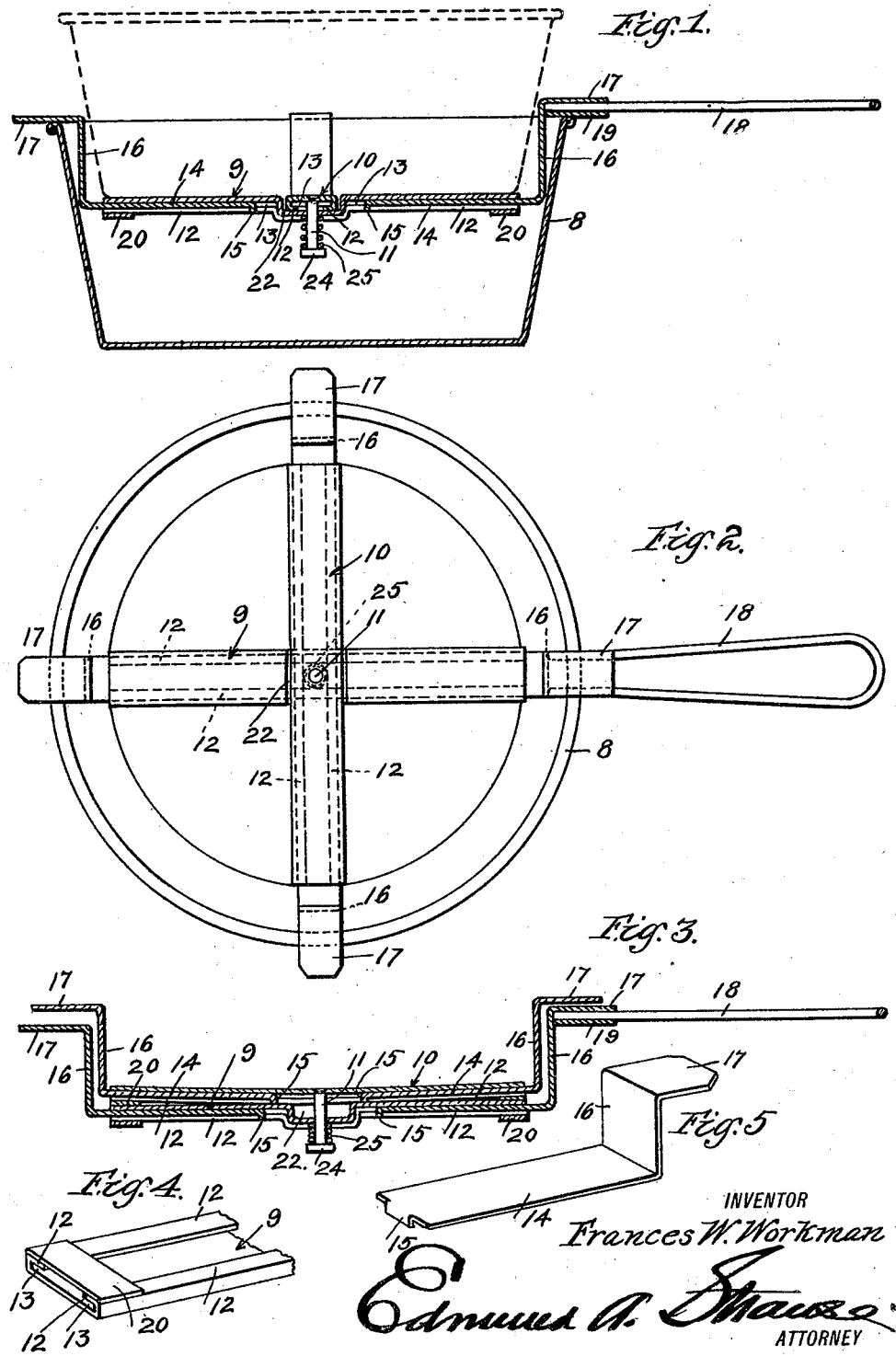

FRANCES W. WORKMAN, OF LOS ANGELES, CALIFORNIA.

KITCHEN UTENSIL.

1,383,779.  Specification of Letters Patent.  Patented July 5, 1921.

Application filed November 18, 1919. Serial No. 338,887.

*To all whom it may concern:*

Be it known that I, FRANCES W. WORKMAN, a citizen of the United States, residing at Los Angeles, in the county of Los Angeles and State of California, have invented new and useful Improvements in Kitchen Utensils, of which the following is a specification.

My invention relates to kitchen utensils, and is particularly adapted to be used for supporting one pot or kettle over another during the cooking process.

An object of my invention is to provide a simple, durable and efficient device whereby one cooking utensil may be conveniently supported over the top of another cooking utensil, both of said utensils being adapted to receive a food product, whereby the heat and steam from the lower utensil, which rests on the stove will serve to keep the contents of the upper utensil warm, thereby effecting great economy in space on the stove, as well as in the fuel consumed.

Another object of my invention is to provide a device which is adjustable, in order that it may be accommodated to cooking utensils of various diameters.

A further object is to provide a device which will project downwardly into the lower cooking utensil, thereby supporting the upper utensil in telescopic relation with the lower utensil, in order that the steam and heat will be retained in the lower utensil, as well as thoroughly concentrated on the bottom of the upper utensil.

Still another object of my invention is to provide a device which when out of use, may be readily folded into a compact unit, in order that it may be stored away in a small space or conveniently packed for shipment.

Other objects will appear in the following description, will be pointed out in the claims, and will be embodied in the accompanying drawings, in which:

Figure 1 represents in vertical section, a kettle showing my supporting device applied thereto, which is also shown in section, and in dotted lines another kettle as it would appear when resting on said supporting device.

Fig. 2 represents a plan view of the lower kettle, showing my device applied in adjusted relation therewith.

Fig. 3 represents a transverse section through my device when it is in a folded state.

Fig. 4 is a perspective view of one end of one of the supporting members, viewed from its underneath surface.

Fig. 5 is a perspective view of one of the extension arms of my device.

In the accompanying drawings, 8 represents a kettle or other cooking utensil, which is adapted to rest over the stove and contain a product in the process of cooking. My device comprises a pair of supporting members 9 and 10, preferably formed of sheet metal and of bar formation, which are pivoted together by a pin 11, at a point approximately midway between their ends. Each of the arms 9 and 10 is provided on their opposite edges with the downwardly and inturned ledges 12, which form guideways 13, adapted to receive for sliding relation therein, the extension arms 14, which are adapted to extend outwardly from the ends of supporting members 9 and 10, and to be adjusted to accommodate cooking utensils of various diameters.

The extensions arms 14 are provided with downturned projections 15 on their inwardly projecting ends, and adjacent their outwardly projecting ends are upturned, as at 16, and then bent at a right angle at their extreme outer ends to form supporting projections 17, which are adapted to rest upon the upper rim of a kettle represented by the numeral 8. One of the extension arms 14 is provided with a handle 18, which extends outwardly and is secured to supporting projections 17 by means of solder or in any other desired manner. As shown, the handle 18 which comprises a piece of wire bent into the shape of a hair pin, rests under projection 17 and is secured between the surface of said projections, and a plate 19, by means of solder.

In order that the extension arms 14 may be limited in their outward movement, I provide stop plates 20, which are soldered or otherwise secured to the extreme outer ends of the ledges 12 of members 9 and 10, against which the projections 15 on extension arms 14 are adapted to engage, and in order that the supporting members 9 and 10, when adjusted in crossed relation over the cooking utensil, may be on the same level with respect to their upper and supporting surfaces, I provide a depression 22 in member 9, into which member 10 is adapted to rest.

In order that members 9 and 10 may be held in adjusted crossed relation, as shown in Figs. 1 and 2, and that they may be readily folded in inoperative relation as shown in Fig. 3, I secure the pivotal pin 11 to member 10. Said pin projects downwardly through an aperture in member 9, and is provided on its lower end with a head 24, between which and the lower surface of member 9 is interposed a spring 25, which surrounds said pin.

By the foregoing construction, it is obvious that when it is desired to fold the members 9 and 10 together in parallel relation when out of use, it is only necessary to swing said members together, the member 10 will then ride above the member 9, against the action of spring 25, which serves to hold said members in close relation with each other.

What I claim is:

1. A device of the class described, comprising a pair of vessel supporting members pivoted together at a point approximately midway between their ends, said ends being provided with extension arms telescopically secured thereto, the end of said extension arms adapted to rest on a cooking utensil.

2. A device of the class described, comprising a pair of vessel supporting members, pivoted together at a point approximately midway between their ends, said ends being adjustable and extending upwardly and outwardly and adapted to rest over a cooking utensil, whereby said supporting members will project downwardly into said cooking utensil.

3. A device of the class described, comprising a pair of vessel supporting members pivoted together at a point approximately midway between their ends, one of said members being provided with a depression adapted to receive the other member when said members are in crossed relation, whereby the upper surfaces of said members will be on the same level.

4. A device of the class described, comprising a pair of vessel supporting members pivoted together at a point approximately midway between their ends, and means whereby said members may be permitted to yield with respect to each other.

In witness that I claim the foregoing I have hereunto subscribed my name this 27th day of October, 1919.

FRANCES W. WORKMAN.